United States Patent [19]

Hiratsuka et al.

[11] Patent Number: 4,768,082

[45] Date of Patent: Aug. 30, 1988

[54] METHODS OF COMPRESSING AND REPRODUCING COLOR IMAGE DATA

[75] Inventors: Seiichiro Hiratsuka; Masahiko Matsunawa, both of Hachioji, Japan

[73] Assignee: Konishiroku Photo Industry Co., Ltd., Tokyo, Japan

[21] Appl. No.: 12,832

[22] Filed: Feb. 10, 1987

[30] Foreign Application Priority Data

Feb. 24, 1986 [JP] Japan .................................. 61-38492

[51] Int. Cl.⁴ ............................................... H04N 1/46
[52] U.S. Cl. ........................................ 358/13; 358/12; 358/133; 358/260; 358/75; 358/80
[58] Field of Search ................... 358/260, 133, 11, 12, 358/13, 75, 283, 284, 80

[56] References Cited

U.S. PATENT DOCUMENTS

| | | | |
|---|---|---|---|
| 4,460,924 | 7/1984 | Lippel | 358/13 |
| 4,553,165 | 11/1985 | Bayer | 358/284 |
| 4,594,726 | 6/1986 | Willis | 358/13 |
| 4,597,005 | 6/1986 | Baleshta | 358/11 |
| 4,656,500 | 4/1987 | Mori | 358/13 |
| 4,672,424 | 6/1987 | Lechner | 358/11 |

Primary Examiner—Howard W. Britton
Attorney, Agent, or Firm—Frishauf, Holtz, Goodman & Woodward

[57] ABSTRACT

A color image data compressing method wherein after the primary color signals of a digital color image have been converted into luminance signals and component color signals, these component color signals are compressed to generate compressed color signals, and the compressed color signals and the luminance signals are binarily processed, respectively, to form information-compressed binary images. The binary images are dither images by the dither method.

10 Claims, 9 Drawing Sheets

FIG. 2(a)

| 16 | 16 | 16 | 15 | 14 | 13 | 12 | 11 | 10 | 9 | 8 | 7 | 6 | 5 | 4 | 3 | 2 | 1 | 0 | 0 |
|---|---|---|---|---|---|---|---|---|---|---|---|---|---|---|---|---|---|---|---|
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |
| 16 | 16 | 16 | 15 | 14 | 13 | 12 | 11 | 10 | 9 | 8 | 7 | 6 | 5 | 4 | 3 | 2 | 1 | 0 | 0 |

ORIGINAL COLOR IMAGE (R)

FIG. 2(b)

| 16 | 16 | 16 | 16 | 15 | 15 | 14 | 14 | 13 | 13 | 12 | 12 | 11 | 11 | 10 | 10 | 9 | 9 | 8 | 8 |
|---|---|---|---|---|---|---|---|---|---|---|---|---|---|---|---|---|---|---|---|
| 16 | 16 | 16 | 15 | 15 | 14 | 14 | 13 | 13 | 12 | 12 | 11 | 11 | 10 | 10 | 9 | 9 | 8 | 8 | 8 |
| 16 | 16 | 15 | 15 | 14 | 14 | 13 | 13 | 12 | 12 | 11 | 11 | 10 | 10 | 9 | 9 | 8 | 8 | 8 | 7 |
| 16 | 15 | 15 | 14 | 14 | 13 | 13 | 12 | 12 | 11 | 11 | 10 | 10 | 9 | 9 | 8 | 8 | 8 | 7 | 7 |
| 15 | 15 | 14 | 14 | 13 | 13 | 12 | 12 | 11 | 11 | 10 | 10 | 9 | 9 | 8 | 8 | 8 | 7 | 7 | 6 |
| 15 | 14 | 14 | 13 | 13 | 12 | 12 | 11 | 11 | 10 | 10 | 9 | 9 | 8 | 8 | 7 | 7 | 6 | 6 | 6 |
| 14 | 14 | 13 | 13 | 12 | 12 | 11 | 11 | 10 | 10 | 9 | 9 | 8 | 8 | 7 | 7 | 6 | 6 | 6 | 5 |
| 14 | 13 | 13 | 12 | 12 | 11 | 11 | 10 | 10 | 9 | 9 | 8 | 8 | 7 | 7 | 6 | 6 | 5 | 5 | 5 |
| 13 | 13 | 12 | 12 | 11 | 11 | 10 | 10 | 9 | 9 | 8 | 8 | 7 | 7 | 6 | 6 | 5 | 5 | 5 | 4 |
| 13 | 12 | 12 | 11 | 11 | 10 | 10 | 9 | 9 | 8 | 8 | 7 | 7 | 6 | 6 | 5 | 5 | 4 | 4 | 4 |
| 12 | 12 | 11 | 11 | 10 | 10 | 9 | 9 | 8 | 8 | 7 | 7 | 6 | 6 | 5 | 5 | 4 | 4 | 3 | 3 |
| 12 | 11 | 11 | 10 | 10 | 9 | 9 | 8 | 8 | 7 | 7 | 6 | 6 | 5 | 5 | 4 | 4 | 3 | 3 | 3 |
| 11 | 11 | 10 | 10 | 9 | 9 | 8 | 8 | 7 | 7 | 6 | 6 | 5 | 5 | 4 | 4 | 3 | 3 | 2 | 2 |
| 11 | 10 | 10 | 9 | 9 | 8 | 8 | 7 | 7 | 6 | 6 | 5 | 5 | 4 | 4 | 3 | 3 | 2 | 2 | 2 |
| 10 | 10 | 9 | 9 | 8 | 8 | 7 | 7 | 6 | 6 | 5 | 5 | 4 | 4 | 3 | 3 | 2 | 2 | 1 | 1 |
| 10 | 9 | 9 | 8 | 8 | 7 | 7 | 6 | 6 | 5 | 5 | 4 | 4 | 3 | 3 | 2 | 2 | 1 | 1 | 1 |
| 9 | 9 | 8 | 8 | 7 | 7 | 6 | 6 | 5 | 5 | 4 | 4 | 3 | 3 | 2 | 2 | 1 | 1 | 0 | 0 |
| 9 | 8 | 8 | 7 | 7 | 6 | 6 | 5 | 5 | 4 | 4 | 3 | 3 | 2 | 2 | 1 | 1 | 0 | 0 | 0 |
| 8 | 8 | 8 | 7 | 7 | 6 | 6 | 5 | 5 | 4 | 4 | 3 | 3 | 2 | 2 | 1 | 1 | 0 | 0 | 0 |
| 8 | 8 | 7 | 7 | 6 | 6 | 5 | 5 | 4 | 4 | 3 | 3 | 2 | 2 | 1 | 1 | 0 | 0 | 0 | 0 |

ORIGINAL COLOR IMAGE (G)

FIG. 2(c)

| 16 | 16 | 16 | 16 | 16 | 16 | 16 | 16 | 16 | 16 | 16 | 16 | 16 | 16 | 16 | 16 | 16 | 16 | 16 | 16 |
|---|---|---|---|---|---|---|---|---|---|---|---|---|---|---|---|---|---|---|---|
| 16 | 16 | 16 | 16 | 16 | 16 | 16 | 16 | 16 | 16 | 16 | 16 | 16 | 16 | 16 | 16 | 16 | 16 | 16 | 16 |
| 15 | 15 | 15 | 15 | 15 | 15 | 15 | 15 | 15 | 15 | 15 | 15 | 15 | 15 | 15 | 15 | 15 | 15 | 15 | 15 |
| 14 | 14 | 14 | 14 | 14 | 14 | 14 | 14 | 14 | 14 | 14 | 14 | 14 | 14 | 14 | 14 | 14 | 14 | 14 | 14 |
| 13 | 13 | 13 | 13 | 13 | 13 | 13 | 13 | 13 | 13 | 13 | 13 | 13 | 13 | 13 | 13 | 13 | 13 | 13 | 13 |
| 12 | 12 | 12 | 12 | 12 | 12 | 12 | 12 | 12 | 12 | 12 | 12 | 12 | 12 | 12 | 12 | 12 | 12 | 12 | 12 |
| 11 | 11 | 11 | 11 | 11 | 11 | 11 | 11 | 11 | 11 | 11 | 11 | 11 | 11 | 11 | 11 | 11 | 11 | 11 | 11 |
| 10 | 10 | 10 | 10 | 10 | 10 | 10 | 10 | 10 | 10 | 10 | 10 | 10 | 10 | 10 | 10 | 10 | 10 | 10 | 10 |
| 9 | 9 | 9 | 9 | 9 | 9 | 9 | 9 | 9 | 9 | 9 | 9 | 9 | 9 | 9 | 9 | 9 | 9 | 9 | 9 |
| 8 | 8 | 8 | 8 | 8 | 8 | 8 | 8 | 8 | 8 | 8 | 8 | 8 | 8 | 8 | 8 | 8 | 8 | 8 | 8 |
| 8 | 8 | 8 | 8 | 8 | 8 | 8 | 8 | 8 | 8 | 8 | 8 | 8 | 8 | 8 | 8 | 8 | 8 | 8 | 8 |
| 7 | 7 | 7 | 7 | 7 | 7 | 7 | 7 | 7 | 7 | 7 | 7 | 7 | 7 | 7 | 7 | 7 | 7 | 7 | 7 |
| 6 | 6 | 6 | 6 | 6 | 6 | 6 | 6 | 6 | 6 | 6 | 6 | 6 | 6 | 6 | 6 | 6 | 6 | 6 | 6 |
| 5 | 5 | 5 | 5 | 5 | 5 | 5 | 5 | 5 | 5 | 5 | 5 | 5 | 5 | 5 | 5 | 5 | 5 | 5 | 5 |
| 4 | 4 | 4 | 4 | 4 | 4 | 4 | 4 | 4 | 4 | 4 | 4 | 4 | 4 | 4 | 4 | 4 | 4 | 4 | 4 |
| 3 | 3 | 3 | 3 | 3 | 3 | 3 | 3 | 3 | 3 | 3 | 3 | 3 | 3 | 3 | 3 | 3 | 3 | 3 | 3 |
| 2 | 2 | 2 | 2 | 2 | 2 | 2 | 2 | 2 | 2 | 2 | 2 | 2 | 2 | 2 | 2 | 2 | 2 | 2 | 2 |
| 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

ORIGINAL COLOR IMAGE (B)

FIG. 3(a)

| 16 | 16 | 16 | 15 | 14 | 14 | 13 | 13 | 12 | 12 | 11 | 10 | 10 | 9 | 8 | 8 | 7 | 7 | 6 | 6 |
|---|---|---|---|---|---|---|---|---|---|---|---|---|---|---|---|---|---|---|---|
| 16 | 16 | 16 | 15 | 14 | 13 | 13 | 12 | 12 | 11 | 11 | 10 | 10 | 9 | 8 | 7 | 7 | 6 | 6 | 6 |
| 15 | 15 | 15 | 14 | 14 | 13 | 12 | 12 | 11 | 11 | 10 | 10 | 9 | 9 | 8 | 7 | 6 | 6 | 6 | 5 |
| 15 | 15 | 15 | 14 | 14 | 13 | 12 | 11 | 11 | 10 | 10 | 9 | 9 | 8 | 8 | 7 | 6 | 6 | 5 | 5 |
| 15 | 15 | 14 | 14 | 13 | 13 | 12 | 11 | 10 | 10 | 9 | 9 | 8 | 8 | 7 | 7 | 6 | 5 | 5 | 4 |
| 14 | 14 | 14 | 13 | 13 | 12 | 12 | 11 | 10 | 9 | 9 | 8 | 8 | 7 | 7 | 6 | 6 | 5 | 4 | 4 |
| 14 | 14 | 13 | 13 | 12 | 12 | 11 | 11 | 10 | 9 | 8 | 8 | 7 | 7 | 7 | 6 | 5 | 5 | 4 | 4 |
| 14 | 13 | 13 | 12 | 12 | 11 | 11 | 10 | 10 | 9 | 8 | 7 | 7 | 7 | 6 | 6 | 5 | 4 | 4 | 4 |
| 13 | 13 | 12 | 12 | 11 | 11 | 10 | 10 | 9 | 9 | 8 | 7 | 7 | 6 | 6 | 5 | 5 | 4 | 3 | 3 |
| 13 | 12 | 12 | 11 | 11 | 10 | 10 | 9 | 9 | 8 | 8 | 7 | 6 | 6 | 5 | 5 | 4 | 4 | 3 | 3 |
| 12 | 12 | 12 | 11 | 10 | 10 | 9 | 9 | 8 | 8 | 7 | 6 | 5 | 5 | 4 | 3 | 3 | 3 | 2 | 2 |
| 12 | 12 | 12 | 11 | 10 | 9 | 9 | 8 | 8 | 8 | 7 | 7 | 6 | 5 | 4 | 4 | 3 | 3 | 2 | 2 |
| 11 | 11 | 11 | 11 | 10 | 9 | 8 | 8 | 8 | 7 | 7 | 6 | 6 | 5 | 4 | 3 | 3 | 2 | 2 | 1 |
| 11 | 11 | 11 | 10 | 10 | 9 | 8 | 8 | 7 | 7 | 6 | 6 | 5 | 5 | 4 | 3 | 2 | 2 | 1 | 1 |
| 11 | 11 | 10 | 10 | 9 | 9 | 8 | 7 | 7 | 6 | 6 | 5 | 5 | 4 | 4 | 3 | 2 | 1 | 1 | 1 |
| 11 | 10 | 10 | 9 | 9 | 8 | 8 | 7 | 6 | 6 | 5 | 5 | 4 | 4 | 3 | 3 | 2 | 1 | 0 | 0 |
| 10 | 10 | 9 | 9 | 9 | 8 | 7 | 7 | 6 | 5 | 5 | 4 | 4 | 3 | 3 | 2 | 2 | 1 | 0 | 0 |
| 10 | 9 | 9 | 9 | 8 | 8 | 7 | 6 | 6 | 5 | 4 | 4 | 3 | 3 | 2 | 2 | 1 | 1 | 0 | 0 |
| 9 | 9 | 9 | 8 | 8 | 7 | 7 | 6 | 5 | 5 | 4 | 3 | 3 | 2 | 2 | 1 | 1 | 0 | -1 | -1 |
| 9 | 9 | 8 | 8 | 7 | 7 | 6 | 6 | 5 | 5 | 4 | 3 | 2 | 2 | 1 | 1 | 0 | 0 | -1 | -1 |

Y SIGNAL

FIG. 3(b)

| 8 | 8 | 8 | 7 | 7 | 6 | 6 | 5 | 5 | 5 | 4 | 4 | 4 | 3 | 3 | 2 | 2 | 2 | 1 | 1 |
|---|---|---|---|---|---|---|---|---|---|---|---|---|---|---|---|---|---|---|---|
| 8 | 8 | 8 | 7 | 7 | 6 | 6 | 6 | 5 | 5 | 4 | 4 | 4 | 3 | 3 | 3 | 2 | 2 | 1 | 1 |
| 8 | 8 | 8 | 7 | 7 | 6 | 6 | 6 | 5 | 5 | 4 | 4 | 4 | 3 | 3 | 3 | 2 | 2 | 2 | 2 |
| 8 | 8 | 8 | 8 | 8 | 7 | 7 | 6 | 6 | 6 | 5 | 5 | 4 | 4 | 4 | 3 | 3 | 2 | 2 | 2 |
| 9 | 9 | 9 | 8 | 8 | 8 | 7 | 7 | 6 | 6 | 6 | 5 | 5 | 4 | 4 | 4 | 3 | 3 | 2 | 3 |
| 9 | 9 | 9 | 9 | 8 | 8 | 8 | 7 | 7 | 6 | 6 | 6 | 5 | 5 | 4 | 4 | 4 | 3 | 3 | 3 |
| 9 | 9 | 10 | 9 | 9 | 8 | 8 | 8 | 7 | 7 | 6 | 6 | 6 | 5 | 5 | 4 | 4 | 4 | 3 | 3 |
| 10 | 10 | 10 | 10 | 9 | 9 | 8 | 8 | 8 | 7 | 7 | 6 | 6 | 5 | 5 | 5 | 4 | 4 | 4 | 4 |
| 10 | 10 | 10 | 10 | 10 | 9 | 9 | 8 | 8 | 8 | 7 | 7 | 6 | 6 | 5 | 5 | 5 | 4 | 4 | 4 |
| 10 | 11 | 11 | 10 | 10 | 10 | 9 | 9 | 8 | 8 | 8 | 7 | 7 | 6 | 6 | 5 | 5 | 5 | 4 | 4 |
| 11 | 11 | 11 | 10 | 10 | 10 | 9 | 9 | 9 | 8 | 8 | 7 | 7 | 6 | 6 | 6 | 5 | 5 | 4 | 5 |
| 11 | 11 | 11 | 11 | 10 | 10 | 10 | 9 | 9 | 8 | 8 | 8 | 7 | 7 | 6 | 6 | 6 | 5 | 5 | 5 |
| 11 | 11 | 12 | 11 | 11 | 10 | 10 | 10 | 9 | 9 | 8 | 8 | 8 | 7 | 7 | 6 | 6 | 6 | 5 | 5 |
| 12 | 12 | 12 | 12 | 11 | 11 | 10 | 10 | 10 | 9 | 9 | 8 | 8 | 8 | 7 | 7 | 6 | 6 | 6 | 6 |
| 12 | 12 | 12 | 12 | 12 | 11 | 11 | 10 | 10 | 10 | 9 | 9 | 8 | 8 | 8 | 7 | 7 | 6 | 6 | 6 |
| 12 | 13 | 13 | 12 | 12 | 11 | 11 | 11 | 10 | 10 | 10 | 9 | 9 | 8 | 8 | 8 | 7 | 7 | 6 | 6 |
| 13 | 13 | 13 | 13 | 12 | 12 | 11 | 11 | 11 | 10 | 10 | 9 | 9 | 8 | 8 | 8 | 7 | 7 | 7 | 7 |
| 13 | 13 | 13 | 13 | 13 | 12 | 12 | 11 | 11 | 11 | 10 | 10 | 10 | 9 | 9 | 8 | 8 | 8 | 7 | 7 |
| 14 | 14 | 14 | 13 | 13 | 13 | 12 | 12 | 11 | 11 | 11 | 10 | 10 | 10 | 9 | 9 | 8 | 8 | 8 | 8 |
| 14 | 14 | 14 | 13 | 13 | 13 | 12 | 12 | 12 | 11 | 11 | 10 | 10 | 10 | 9 | 9 | 9 | 8 | 8 | 8 |

I SIGNAL

FIG. 3(c)

| 8 | 8 | 8 | 7 | 8 | 7 | 8 | 8 | 8 | 8 | 8 | 8 | 8 | 8 | 8 | 8 | 8 | 8 | 8 | 8 |
|---|---|---|---|---|---|---|---|---|---|---|---|---|---|---|---|---|---|---|---|
| 8 | 8 | 8 | 8 | 8 | 8 | 8 | 8 | 8 | 8 | 8 | 8 | 8 | 8 | 8 | 8 | 8 | 9 | 8 | 8 |
| 7 | 7 | 8 | 8 | 8 | 8 | 8 | 8 | 8 | 8 | 8 | 8 | 8 | 8 | 8 | 8 | 8 | 8 | 8 | 9 |
| 7 | 7 | 7 | 8 | 8 | 8 | 8 | 8 | 8 | 8 | 8 | 8 | 8 | 8 | 8 | 8 | 8 | 8 | 8 | 8 |
| 7 | 7 | 8 | 7 | 8 | 8 | 8 | 8 | 8 | 8 | 8 | 8 | 8 | 8 | 8 | 8 | 8 | 8 | 8 | 8 |
| 7 | 7 | 7 | 8 | 7 | 8 | 8 | 8 | 8 | 8 | 8 | 8 | 8 | 8 | 8 | 8 | 8 | 8 | 8 | 8 |
| 7 | 7 | 8 | 7 | 8 | 7 | 8 | 8 | 8 | 8 | 8 | 8 | 8 | 8 | 8 | 8 | 8 | 8 | 8 | 8 |
| 7 | 7 | 7 | 8 | 7 | 8 | 7 | 8 | 8 | 8 | 8 | 8 | 8 | 8 | 8 | 8 | 8 | 8 | 8 | 8 |
| 7 | 7 | 7 | 7 | 8 | 7 | 8 | 7 | 8 | 8 | 8 | 7 | 8 | 8 | 8 | 8 | 8 | 8 | 8 | 8 |
| 7 | 7 | 7 | 7 | 7 | 8 | 7 | 8 | 7 | 8 | 8 | 7 | 8 | 7 | 8 | 8 | 8 | 8 | 8 | 8 |
| 7 | 7 | 8 | 7 | 8 | 8 | 8 | 8 | 8 | 8 | 8 | 8 | 8 | 8 | 8 | 8 | 8 | 8 | 8 | 8 |
| 7 | 7 | 7 | 8 | 7 | 8 | 8 | 8 | 8 | 7 | 8 | 8 | 8 | 8 | 8 | 8 | 8 | 8 | 8 | 8 |
| 7 | 7 | 8 | 7 | 8 | 7 | 8 | 8 | 7 | 8 | 7 | 8 | 8 | 8 | 8 | 8 | 8 | 8 | 8 | 8 |
| 7 | 7 | 7 | 8 | 7 | 8 | 7 | 7 | 8 | 7 | 8 | 7 | 8 | 8 | 8 | 8 | 8 | 8 | 8 | 8 |
| 7 | 7 | 7 | 7 | 8 | 7 | 7 | 7 | 7 | 8 | 7 | 8 | 7 | 8 | 8 | 8 | 8 | 8 | 8 | 8 |
| 7 | 7 | 7 | 7 | 7 | 7 | 7 | 7 | 7 | 7 | 8 | 7 | 8 | 7 | 8 | 8 | 8 | 8 | 8 | 8 |
| 7 | 7 | 7 | 7 | 7 | 7 | 7 | 7 | 7 | 7 | 7 | 8 | 7 | 8 | 7 | 8 | 8 | 8 | 8 | 8 |
| 7 | 7 | 7 | 7 | 7 | 7 | 7 | 7 | 7 | 7 | 7 | 7 | 8 | 7 | 8 | 7 | 8 | 8 | 8 | 8 |
| 7 | 7 | 7 | 7 | 7 | 7 | 7 | 7 | 7 | 7 | 7 | 7 | 7 | 8 | 7 | 8 | 7 | 8 | 8 | 8 |
| 7 | 7 | 7 | 7 | 7 | 7 | 7 | 7 | 8 | 7 | 8 | 7 | 8 | 8 | 8 | 8 | 8 | 8 | 8 | 8 |

Q SIGNAL

FIG. 4(a)

|8|8|7|6|5|4|4|3|2|1|
|---|---|---|---|---|---|---|---|---|---|
|8|8|7|6|6|5|4|3|3|2|
|9|9|8|7|6|6|5|4|3|3|
|10|10|9|8|7|6|6|5|4|4|
|10|10|10|9|8|7|6|5|5|4|
|11|11|10|9|9|8|7|6|5|5|
|12|12|11|10|9|8|8|7|6|6|
|12|12|12|11|10|9|8|8|7|6|
|13|13|12|11|11|10|9|8|8|7|
|14|14|13|12|11|11|10|9|8|8|

COMPRESSED I SIGNAL (I')

FIG. 4(b)

|8|8|8|8|8|8|8|8|8|8|
|---|---|---|---|---|---|---|---|---|---|
|7|8|8|8|8|8|8|8|8|8|
|7|8|8|8|8|8|8|8|8|8|
|7|8|8|8|8|8|8|8|8|8|
|7|7|8|8|8|8|8|8|8|8|
|7|8|8|8|8|8|8|8|8|8|
|7|8|8|8|8|8|8|8|8|8|
|7|7|7|7|7|8|8|8|8|8|
|7|7|7|7|7|7|8|8|8|8|
|7|7|7|7|7|7|8|8|8|8|

COMPRESSED Q SIGNAL (Q')

FIG. 5

|0|8|2|10|
|---|---|---|---|
|12|4|14|6|
|3|11|1|9|
|15|7|13|5|

DITHER MATRIX

FIG. 6(a)

DITHER IMAGE BY

DITHER IMAGE B₁'

DITHER IMAGE B_Q'

FIG. 9(a)

| 13 | 13 | 12 | 11 | 11 | 9 | 9 | 9 | 9 | 9 | 9 | 7 | 7 |
|----|----|----|----|----|---|---|---|---|---|---|---|---|
| 13 | 13 | 12 | 11 | 11 | 9 | 9 | 8 | 8 | 8 | 8 | 7 | 7 |
| 13 | 13 | 12 | 11 | 11 | 9 | 9 | 7 | 7 | 7 | 7 | 7 | 7 |
| 12 | 12 | 12 | 11 | 11 | 9 | 9 | 7 | 7 | 6 | 6 | 6 | 6 |
| 11 | 11 | 11 | 11 | 11 | 9 | 9 | 7 | 7 | 6 | 6 | 6 | 6 |
| 11 | 11 | 11 | 11 | 11 | 9 | 9 | 7 | 7 | 5 | 5 | 5 | 5 |
| 11 | 10 | 10 | 9  | 9  | 8 | 8 | 7 | 7 | 5 | 5 | 5 | 5 |
| 11 | 10 | 10 | 9  | 9  | 8 | 8 | 7 | 7 | 5 | 5 | 4 | 4 |
| 11 | 9  | 9  | 8  | 8  | 8 | 8 | 7 | 7 | 5 | 4 | 3 | 3 |
| 11 | 9  | 9  | 7  | 7  | 7 | 7 | 7 | 7 | 5 | 4 | 3 | 3 |
| 10 | 9  | 9  | 7  | 7  | 7 | 7 | 7 | 7 | 5 | 4 | 3 | 2 |
| 10 | 9  | 9  | 7  | 7  | 6 | 6 | 5 | 5 | 4 | 3 | 3 | 2 |
| 9  | 9  | 9  | 7  | 7  | 6 | 6 | 5 | 5 | 4 | 3 | 3 | 1 |

INFERRED HALFTONE IMAGE ($\overline{Y}$)

FIG. 9(b)

| 9  | 7  | 7  | 5  | 4  | 3 | 3 |
|----|----|----|----|----|---|---|
| 9  | 7  | 7  | 5  | 4  | 4 | 4 |
| 10 | 8  | 8  | 5  | 5  | 5 | 5 |
| 10 | 9  | 9  | 7  | 7  | 6 | 6 |
| 11 | 11 | 11 | 8  | 8  | 6 | 6 |
| 11 | 11 | 11 | 9  | 9  | 7 | 7 |
| 12 | 11 | 11 | 10 | 10 | 8 | 8 |

INFERRED HALFTONE IMAGE ($\overline{I'}$)

FIG. 9(c)

| 7 | 8 | 8 | 8 | 8 | 8 | 8 |
|---|---|---|---|---|---|---|
| 7 | 8 | 8 | 8 | 8 | 8 | 8 |
| 7 | 8 | 8 | 8 | 8 | 8 | 8 |
| 7 | 8 | 8 | 8 | 8 | 8 | 8 |
| 7 | 8 | 8 | 8 | 8 | 8 | 8 |
| 7 | 8 | 8 | 8 | 8 | 8 | 8 |
| 7 | 8 | 8 | 8 | 8 | 8 | 8 |

INFERRED HALFTONE IMAGE ($\overline{Q'}$)

FIG. 11(a)

| 9  | 8  | 7  | 7  | 7  | 6  | 5  | 5  | 4 | 4 | 3 | 3 | 3 |
|----|----|----|----|----|----|----|----|---|---|---|---|---|
| 9  | 8  | 7  | 7  | 7  | 6  | 5  | 5  | 4 | 4 | 4 | 4 | 4 |
| 9  | 8  | 7  | 7  | 7  | 6  | 5  | 5  | 4 | 4 | 4 | 4 | 4 |
| 10 | 9  | 8  | 8  | 8  | 6  | 5  | 5  | 5 | 5 | 5 | 5 | 5 |
| 10 | 9  | 8  | 8  | 8  | 7  | 5  | 5  | 5 | 5 | 5 | 5 | 5 |
| 10 | 9  | 9  | 9  | 9  | 7  | 6  | 6  | 6 | 6 | 6 | 6 | 6 |
| 10 | 10 | 9  | 9  | 9  | 8  | 7  | 7  | 7 | 6 | 6 | 6 | 6 |
| 11 | 10 | 10 | 10 | 10 | 9  | 8  | 8  | 8 | 7 | 6 | 6 | 6 |
| 11 | 11 | 11 | 11 | 11 | 10 | 8  | 8  | 8 | 7 | 6 | 6 | 6 |
| 11 | 11 | 11 | 11 | 11 | 10 | 9  | 9  | 9 | 8 | 7 | 7 | 7 |
| 11 | 11 | 11 | 11 | 11 | 10 | 9  | 9  | 9 | 8 | 7 | 7 | 7 |
| 12 | 11 | 11 | 11 | 11 | 10 | 10 | 10 | 10| 9 | 8 | 8 | 8 |
| 12 | 12 | 11 | 11 | 11 | 11 | 10 | 10 | 10| 9 | 8 | 8 | 8 |

REPRODUCED CHROMATICITY IMAGE AFTER INTERPOLATION (T)

FIG. 11(b)

| 7 | 8 | 8 | 8 | 8 | 8 | 8 | 8 | 8 | 8 | 8 | 8 | 8 |
|---|---|---|---|---|---|---|---|---|---|---|---|---|
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |
| 7 | 8 | 8 | 8 | 8 | 8 | 8 | 8 | 8 | 8 | 8 | 8 | 8 |

REPRODUCED CHROMATICITY IMAGE AFTER INTERPOLATION ($\overline{Q}$)

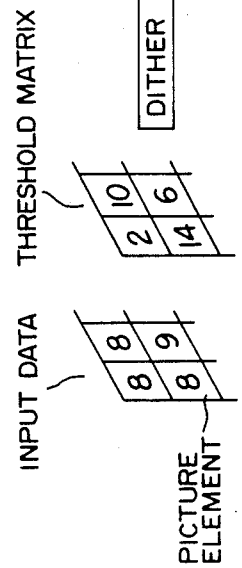
FIG. 12(a) DEMODULATED PRIMARY COLOR IMAGE (R̄)
FIG. 12(b) DEMODULATED PRIMARY COLOR IMAGE (Ḡ)
FIG. 12(c) DEMODULATED PRIMARY COLOR IMAGE (B̄)
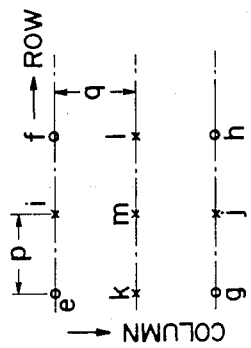
FIG. 10
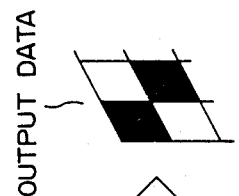
FIG. 13 DITHER METHOD

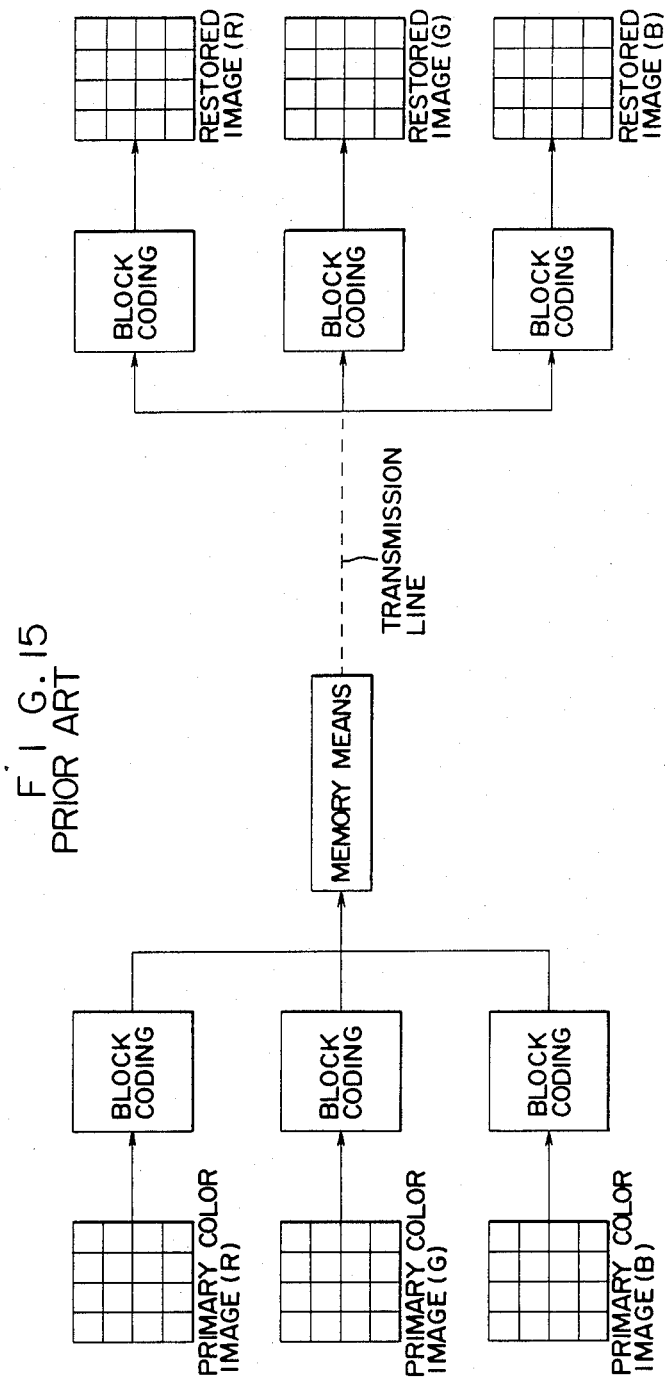

METHODS OF COMPRESSING AND REPRODUCING COLOR IMAGE DATA

BACKGROUND OF THE INVENTION

1. Field of the Invention

The present invention relates to color image data compressing and reproducing methods which is appropriate when used in case primary color image data are stored and transmitted after they have been converted into binary image data.

2. Description of the Prior Art

An output device such as a display device or a printing device outputs binary, i.e., black and white image data which have been converted from an original image. The dither method is well known in the art as a method of expressing a pseudo-halftone by that output device.

This dither method is one kind of area gradation, by which the halftone image is expressed by varying the number of dots to be recorded in a constant area (or matrix) to record a portion corresponding to one picture element of a document in one dot, as shown in FIG. 13. As a result, there are obtained binary output data, as shown. These output data express a halftone image in pseudo-binary values of white and black.

Now, a number of methods are known for coding the halftone white and black image thus obtained. For coding the color halftone image, a main method is to separately code the three halftone images which are formed from the respective primary color signals R, G and B.

An example of the prior art, in which a block coding or one method of coding the halftone image is applied to a halftone color image, is shown in FIG. 14.

The block coding method is an information non-retained type image coding. Therefore, an original halftone image is divided into block images of totally 16 picture elements of 4×4 picture elements, and for each block an average picture element level $P_0$ is calculated to determine a picture element level average $P_1$ lower than $P_0$ and a picture element level average $P_2$ higher than $P_0$.

Next, the resolution information is prepared by setting picture elements lower than $P_0$ at "0" and picture elements higher than $P_0$ at "1". In the coding method, moreover, the information compression is conducted for that resolution information and the gradation information of $P_1$ and $P_2$.

In case the original block image is shown in FIG. 14(a), for example, the average value $P_0$ of the image levels of all the blocks is expressed by $P_0=7$ (as shown in FIG. 14(b)). Likewise, the average $P_2$ of the image levels (of totally 6 picture elements) higher than that average $P_0$ is expressed by $P_2=12$. On the other hand, the average $P_1$ of the image levels (of totally 10 picture elements) lower than the average $P_0$ is expressed by $P_1=4$.

As a result, the resolution information obtained by comparing the image level of the original block image with the average $P_0$ is shown in FIG. 14(c). This resolution information (i.e., the information of "1" and "0") and the information on the averages $P_1$ and $P_2$, i.e., the gradation information are stored and then transmitted.

The image decoding is conducted by applying the gradation information $P_1$ to the picture elements of the resolution information "0" and the gradation information $P_2$ to the picture elements of the resolution information "1". As a result, a decoded image is obtained, as shown in FIG. 14(d).

This block coding method is applied to the block coding of each color halftone image.

In case the color halftone image is to be block-coded, as shown in FIG. 15, three primary color images R, G and B are individually block-coded by the aforementioned method, and the coded information is once stored in memory means until it is transmitted to destinations through a telephone or leased circuit.

At a reception side, the transmitted information is individually block-coded to reproduce a color halftone image.

Incidentally, men have the following visual characteristics in relation to the image discrimination:

(1) Generally speaking, men have a low gradation discriminating capability in a region of large picture element level variations but a high one in a region of small picture element level variations; and (2) In a color image, men are sensitive to variations in a luminance level but insensitive to those in a chromaticity level.

In the example of the prior art shown in FIG. 15, on the contrary, the aforementioned visual characteristics are not taken into consideration because the primary color signals of the three R, G and B channels are block-coded as they are. As a result, the image data are liable to be coded, even if they need not be intrinsically coded, to raise a serious obstruction against the coding efficiency.

SUMMARY OF THE INVENTION

An object of the present invention is to propose color image data compressing and reproducing methods which are enabled by considering the human visual characteristics to compress digital color halftone image data to be block-coded without deteriorating the quality of an original image and to reproduce those compressed data in a satisfactory manner.

In order to solve the problems thus far described, according to a first aspect of the present invention, there is provided a color image data compressing method characterized in that after the three primary color signals of a digital color image have been converted into luminance signals and component color signals, these component color signals are compressed to generate compressed color signals; and in that said compressed color signals and said luminance signals are binarily processed, respectively, to form information-compressed binary images.

According to a second aspect of the invention, there is provided a color image data reproducing method characterized in that, when the binary images compressed in accordance with the first aspect of the invention, i.e., binary images generated from both compressed color signals generated from said component color signals and said luminance signals are to be reproduced, said binary images of said compressed color signals and said luminance signals are restored into a halftone image whereas the restored compressed color signals are reproduced into said component color signals; and in that said component color signals and said reproduced luminance signals are converted into the primary color signals composing a digital color image.

Other objects and features of the present invention will become apparent from the following description taken with reference to the accompanying drawings.

BRIEF DESCRIPTION OF THE DRAWINGS

FIGS. 2(a), 2(b) and 2(c) are diagrams showing one example of an original color image;

FIGS. 3(a), 3(b) and 3(c) are diagrams showing one example of luminance signals after having been converted into a standard type and a pair of chromatic images;

FIGS. 4(a) and 4(b) are diagrams showing one example of a compressed chromatic image;

FIG. 5 is a diagram showing one example of the threshold level of a dither matrix;

FIGS. 6(a), 6(b) and 6(c) are diagrams showing one example of a dither image;

FIG. 7 is a block diagram showing one example of selected apertures;

FIG. 8 is a diagram showing one example of aperture selecting conditions;

FIGS. 9(a), 9(b) and 9(c) are diagrams showing one example of an inferred halftone image;

FIG. 10 is a diagram for explaining a bilinear interpolation;

FIGS. 11(a) and 11(b) are diagrams showing one example of a reproduced chromatic image interpolated;

FIGS. 12(a), 12(b) and 12(c) are diagrams showing one example of a primary color image reproduced;

FIG. 13 is a view showing a binary processing to be used for explaining the present invention;

FIGS. 14(a), 14(b), 14(c) and 14(d) are diagrams showing one example of a block coding method; and FIG. 15 is a block diagram showing one example of the block coding method of the prior art.

DESCRIPTION OF THE PREFERRED EMBODIMENTS

The color image data compressing and reproducing methods according to the present invention will be described in detail in the following with reference to the accompanying drawings.

As has been described hereinbefore, according to the present invention, the compressed coding and reproduction (or reproducing) are conducted by making skillful use of the visual characteristics owned intrinsically by men.

Figure 1:
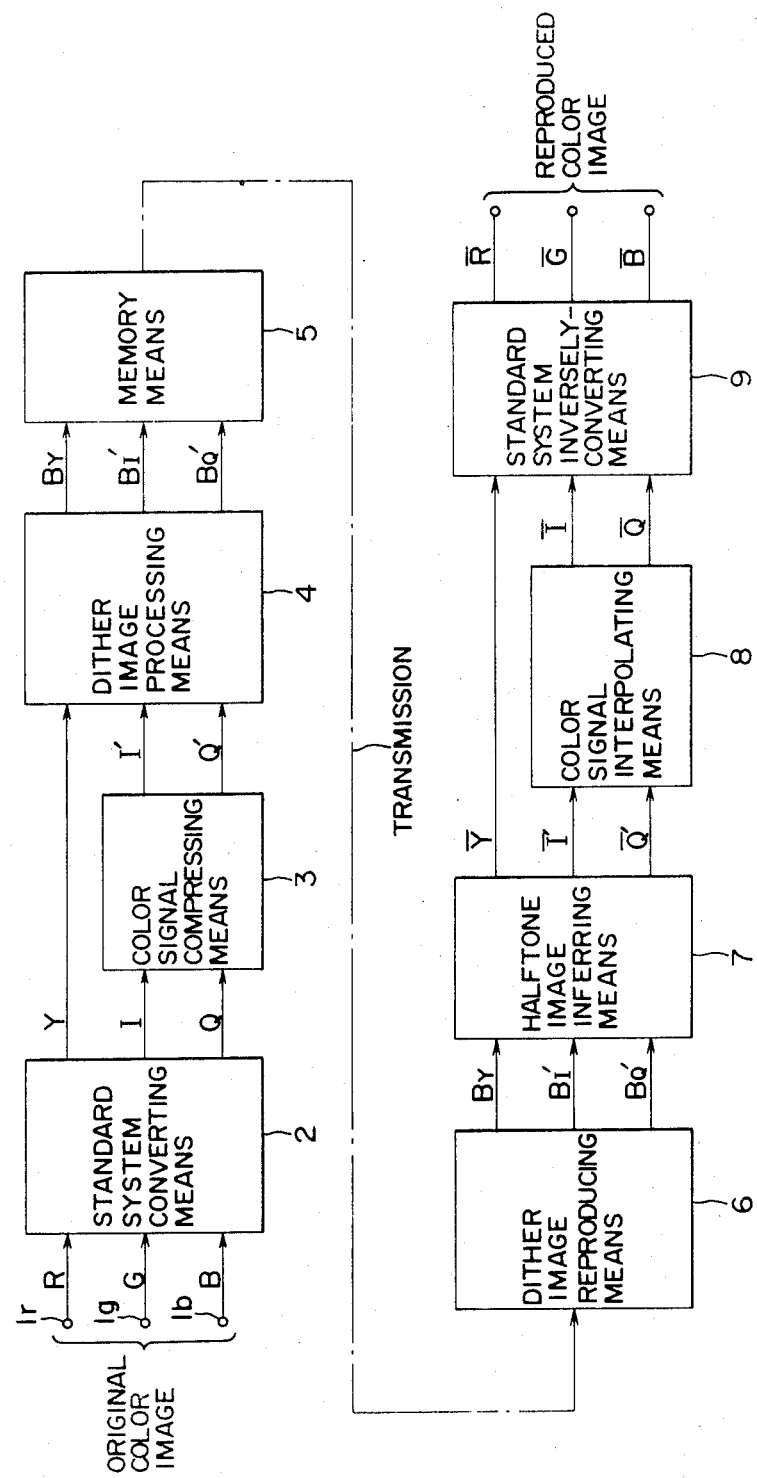
FIG. 1 is a block diagram showing one example of data compressing and reproducing circuits to be used for realizing the color image data information compressing method according to the present invention.

FIG. 1 is a block diagram showing one example of data compressing and reproducing means which is appropriate when applied to the method of the present invention.

For convenience of explanation, the summary of the block diagram will be first described in the signal processing order. Halftone images of three R, G and B channels of an original color image are first converted by standard system converting means 2 into color image signals (each of which is composed of a luminance component Y and two chromaticity components I and Q) of NTSC system, i.e., one standard system of color television.

The system for a color image conversion should not be limited to the NTSC system but may be any if it converts the color image into the luminance signal and the color signals.

The chromaticity components I and Q are compressed by their compressing means 3 into compressed chromaticity signals I′ and Q′. The luminance signal Y and the compressed chromaticity signals I′ and Q′ are respectively fed to and binarily processed by binary processing means 4.

The dither method can be applied to the binary processing, as will be described hereinafter.

Binary image signals $B_Y$, $B_I'$ and $B_Q'$ are stored in memory means 5 until they are transmitted.

These binary image signals $B_Y$, $B_I'$ and $B_Q'$ are reproduced (or restored) at a subsequent processing step into a primary color image. For this operation, the binary image signals $B_Y$, $B_I'$ and $B_Q'$ are reproduced by image data reproducing means 6 and are then fed to halftone image inferring means 7 so that they are reproduced into halftone image signals $\overline{Y}$, $\overline{I'}$ and $\overline{Q'}$ (wherein the symbol "—" means an inferred value).

The compressed chromaticity signals $\overline{I'}$ and $\overline{Q'}$ of the reproduced halftone image are fed to interpolating means 8 so that their data are interpolated.

The interpolated chromaticity signals $\overline{I}$ and $\overline{Q}$ and the halftone image luminance signal $\overline{Y}$ are fed to standard system inversely-converting means 9 so that they are converted into primary color signals $\overline{R}$, $\overline{G}$ and $\overline{B}$.

The primary color image signals (or data) are reproduced by the signal processing described above.

Next, a specific processing method will be described in detail.

Input terminals 1r, 1g and 1b are fed with the halftone image signals (which will be conveniently referred to as "R", "G" and "B"), which have been produced from the primary images of three R, G and B channels.

One example of the picture element levels of these halftone image signals is shown in FIG. 2. This figure presents one example of the halftone image having 16 gradation levels of 0 (the minimum) to 16 (the maximum) as the picture element levels.

These halftone image signals R, G and B are converted by the TV standard system converting means 2 into the luminance signal Y and the component color signals. In the case of the NTSC system, the three halftone image signals R, G and B are converted into the luminance signal Y and a pair of component color signals, e.g., the paired chromaticity signals I and Q in this example. The conversion equations are as follows:

$$Y = 0.30R + 0.59G + 0.11B - 0.5 \tag{1},$$

$$I = 0.50R - 0.23G - 0.27B + 7.5 \tag{2},$$

and $$Q = 0.20R - 0.50G + 0.30B + 7.5 \tag{3}.$$

Here, since the picture element levels of the original halftone image are 0 to 16, normalizing constant (i.e., −0.5, +7.5 and +7.5) are incorporated so as to maintain conformity between the converted signals and the original halftone image signals.

FIG. 3 shows one example of the data-converted signals Y, I and Q.

Now, in case the information compression is to be conducted for those luminance signal Y and paired chromaticity signals I and Q, it is preferable to conduct the information compression of only the paired chromaticity signals I and Q if taken into consideration are the human visual characteristics that the gradation discriminating capability is high for the luminance level but low for the chromaticity levels, as has been described hereinbefore.

Therefore, only the paired chromaticity signals I and Q are fed to the color signal compressing means 3 to produce the compressed chromaticity signals I' and Q'. FIG. 4(a) shows the compressed chromaticity signal I', and FIG. 4(b) shows the compressed chromaticity signal Q'.

The data compression is conducted by averaging the chromaticity signals I and Q, in which 2×2 picture elements are averaged to 1 picture element to reduce the number of picture elements.

In this embodiment, 2×2 picture elements are averaged as a data compression method. However, other known data compression methods may be used.

The paired data-compressed chromaticity signals I' and Q' and the luminance signal Y are fed to the binary processing means 4 so that they are converted into a binary white and black image, i.e., a dither image.

This example is exemplified by an ordered dither method, especially a Bayer type dither method. The Bayer type threshold matrix to be used in this dither method takes a dither pattern in which 0 to 15 threshold values are dispersed, as shown in FIG. 5.

Figures 6B, 6C, 7, 8:
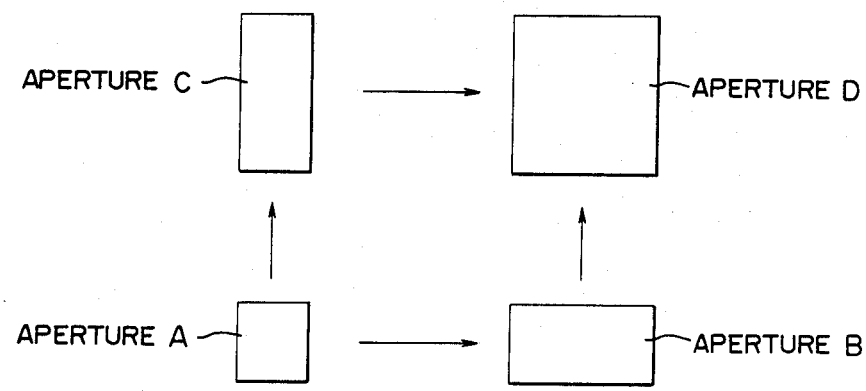

As a result, the dither images $B_Y$, $B_I'$ and $B_Q'$ shown in FIGS. 6(a) to 6(c) are obtained. Here, the levels of the reference image before the dither processing are shown as "1", if they are higher than the levels of the dither matrix corresponding to that reference image, and as "0" if they are equal to or lower than the same.

For example, the dither matrix of FIG. 5 is made binary, as shown in a region surrounded by broken lines in FIG. 6(a), if it is superposed on the region of single dot-and-chain lines in FIG. 3(a) to have its picture element levels compared between the corresponding picture elements.

By executing such binary processing while being shifted sequentially in row and column directions at the dither matrix unit of 4×4, the dither images $B_Y$, $B_I'$ and $B_Q'$ corresponding to the luminance signal Y and the paired compressed chromaticity signals I' and Q' are obtained, as shown in FIGS. 6(a) to 6(c).

Incidentally, in this dither processing, the picture elements to be contained in the dither region are desired to be completely contained, as shown in FIG. 3.

These dither image data $B_Y$, $B_I'$ and $B_Q'$ are fed to and stored by the memory means 5 such as a RAM, or are transmitted to the destinations through a communication circuit such as a telephone or leased circuit.

Alternatively, these image data $B_Y$, $B_I'$ and $B_Q'$ may be converted into the run length codes used in a facsimile so that the image data to be transmitted may be stored and fed to the communication circuit after they have been further compressed.

Next, the method of reproducing the dither images will be described in the following.

As shown in FIG. 1, the image data are at first fed to the dither image reproducing means 6 so that the dither images (of FIG. 6) are reproduced (or restored). This means is effective especially when the dither images are coded.

The reproduced dither images $B_Y$, $B_I'$ and $B_Q'$ are fed to the halftone image inferring means 7 so that the halftone image data are inferred on the basis of the respective image data of the dither images $B_Y$, $B_I'$ and $B_Q'$.

In the present invention, the inferring method used is conducted by setting a plurality of scanning apertures on the dither images, by counting the number of white picture elements ("1") (or black picture elements ("0")) of the dither images existing in those scanning apertures, and by selecting the scanning apertures, in which the counted values satisfy predetermined conditions, sequentially for the individual picture elements.

As shown in FIG. 7, there are used four kinds of scanning apertures which have different aperture areas.

An aperture D has the same area of 4×4 as that of the dither matrix. Moreover, apertures B and C having different shapes but an equal area have one half of the area of the aperture D. An aperture A has the minimum area of one quarter of the area of the aperture D. Therefore, since the apertures B and C and the aperture A have an area equal to that of the scanning aperture D if the former and the latter are multiplied two times and four times, respectively, the scanning apertures B, C have a gain 2 whereas the scanning aperture A has a gain 4 if the gain of the scanning aperture D is 1.

Here, which of those four scanning apertures is to be used as the selecting aperture of the halftone images may be determined on a condition that the picture element levels reproduced are unchanged. This is because the selection of the maximum aperture despite of the level change in the reference region would not properly infer the picture element levels of the halftone images.

In this example, the condition of no change in the picture levels is determined as follows, provided that letters a to d designate the (total) number of the white picture elements in the scanning apertures A to D, respectively:

$$|2a-b| \leq 1 \qquad (4),$$

$$|2a-c| \leq 1 \qquad (5),$$

$$|2b-d| \leq 1 \qquad (6),$$

and $$|2c-d| \leq 1 \qquad (7).$$

The apertures to be used for the individual conditions are determined, as shown in FIG. 8, by using a symbol ○ in case those conditions are satisfied and otherwise a symbol X.

A symbol appearing in FIG. 8 represents the symbol ○ or X.

For example, in case the equations (4) and (5) are not satisfied, the aperture A is selected without checking whether or not the equations (6) and (7) are satisfied. On the other hand, the aperture B is selected in case the equation (4) but not the equation (5) is satisfied, whereas the aperture C is selected in case not the equation (4) but the equation (5) is satisfied. The aperture D is selected in case all the equations (4) to (7) are satisfied.

Now, in case a proper one is calculated from those scanning apertures A to D for each picture element of each of the dither images $B_Y$, $B_I'$ and $B_Q'$, the dither images $B_I'$ and $B_Q'$ have their data compressed, as different from the dither image $B_Y$ shown in FIG. 6. As a result, if the halftone images of the dither images $B_Y$, $B_I'$ and $B_Q'$ are inferred from the respective regions of the broken lines in FIG. 6, the halftone images $\overline{B_Y}$ and ($\overline{B_I'}$ and $\overline{B_Q'}$) obtained fail to correspond.

This is partly because the inferred image positions in the regions shown by the broken lines in FIG. 6(a) and in FIGS. 6(b) and 6(c) are self-explanatorily different and partly because the processing without any change would remarkably deviate the sampling positions of the luminance signal Y and the chromaticity signals I and Q.

Thus, in order to match the inferred picture element positions of the dither images $B_I'$ and $B_Q'$ with the dither image $B_Y$, only the inside of the single dot-and-dash region shown in FIG. 6(a) is used as a conversion region for the dither image $B_Y$.

Therefore, the aforementioned processing is executed, while the aforementioned apertures A to D are sequentially shifted element by element, by registering the aperture center with the position of symbol ○ for the dither image $B_Y$ and the aperture centers with the positions of the symbol ○ for the dither images $B_I'$ and $B_Q'$.

A specific example of the inferences will be described in the following.

First of all, if the total values of the numbers of the white picture elements existing in the apertures A to D, respectively, are designated as a to d, the optimum apertures when the center positions of the apertures A to D of the dither images shown in FIG. 7 are located at [4, 4] are a=4, b=7, c=7 and d=13. Then, the conditional equations (4) to (7) are determined:

$$|2a-b| = |8-7| = 1,$$

$$|2a-c| = |8-7| = 1,$$

$$|2b-d| = |14-13| = 1,$$

and $$|2c-d| = |14-13| = 1.$$

Thus, all the equations (4) to (7) are satisfied.

Therefore, the optimum aperture to be selected in view of FIG. 8 is D.

In case this aperture D is selected, the value of the picture element (which corresponds to the picture element of 1st row and 1st column of the dither images $B_I'$ and $B_Q'$) of 3rd row and 3rd column of the halftone image is inferred. Since the number of the white picture elements in the initial position when the aperture D is selected is d=13 whereas the gain of the aperture D is 1, the inferred value of the halftone image is 13×1=13, as shown in FIG. 9(a).

FIG. 9 shows the inferred halftone image $\overline{Y}$ and the compressed halftone images I' and Q' of the individual dither images $B_Y$, $B_I'$ and $B_Q'$ thus obtained.

The inferred compressed halftone images $\overline{I'}$ and $\overline{Q'}$ are fed to the color signal interpolating means 8 so that their data expansions will generate the reproduced chromaticity signals $\bar{I}$ and $\bar{Q}$. In this example, the data of the inferred compressed halftone images $\overline{I'}$ and $\overline{Q'}$ are interpolated by the bilinear interpolation.

FIG. 10 shows one example of the bilinear interpolation.

In FIG. 10, the symbol ○ designates the picture element having its data compressed, and the symbol X designates the picture element to be interpolated.

A picture element in the column direction is interpolated by picture elements (e, f) and (g, h) in the same rows. More specifically, if the interval between the adjacent picture elements in the row and column directions before their interpolations is set at 1 and if the intervals to the interpolated picture elements are set at p and q, the following equations hold:

$$i = (1-p)e + pf \quad (8),$$

$$j = (1-p)g + ph \quad (9).$$

$$k = (1-q)e + qg \quad (10).$$

and $$l = (1-p)f + ph \quad (11).$$

Since both p and q are $\frac{1}{2}$, the above equations are rewritten as follows:

$$i = \tfrac{1}{2}(e+f) \quad (12),$$

$$j = \tfrac{1}{2}(g+h) \quad (13),$$

$$k = \tfrac{1}{2}(e+g) \quad (14),$$

and $$l = \tfrac{1}{2}(f+h) \quad (15).$$

Likewise, the center picture element m of the picture elements e to h is interpolated by the following equation:

$$\begin{aligned} m &= (1-p)(1-q)e + p(1-q)f \\ &\quad + (1-p)qg + pqh \\ &= \tfrac{1}{4}(e+f+g+h). \end{aligned} \quad (16)$$

As a result, if the data between the adjacent picture elements are interpolated by that bilinear interpolation, the reproduced chromaticity signals $\bar{I}$ and $\bar{Q}$ are shown in FIG. 11.

It goes without saying that the inferred halftone image $\overline{Y}$ concerning the luminance component is not interpolated.

The paired reproduced chromaticity image signals $\bar{I}$ and $\bar{Q}$ having their data interpolated and the inferred halftone image signal $\overline{Y}$ are fed to and inversely converted (or demodulated) by the standard system inversely-converting means 9 into the primary color signals of R, G and B.

In this case, the inverse conversion is conducted on the basis of the following equations. If the matrix IM of each coefficient of the color television standard system of the NTSC type expressed by the equation (1) is as follows:

$$IM = \begin{bmatrix} 0.33 & 0.59 & 0.11 \\ 0.50 & -0.23 & -0.27 \\ 0.20 & -0.50 & 0.30 \end{bmatrix} \quad (17)$$

then the equation (1) is transformed into the following equation:

$$\begin{bmatrix} Y \\ I \\ Q \end{bmatrix} = [IM] \cdot \begin{bmatrix} R \\ G \\ B \end{bmatrix} + \begin{bmatrix} -0.5 \\ 7.5 \\ 7.5 \end{bmatrix} \quad (18)$$

Therefore, if 0.5 is added so as to correct the threshold values of the dither image and the reproduced values, then:

$$\begin{bmatrix} Y \\ I \\ Q \end{bmatrix} = [IM] \cdot \begin{bmatrix} R \\ G \\ B \end{bmatrix} + \begin{bmatrix} 0 \\ 8 \\ 8 \end{bmatrix} \quad (19)$$

Therefore, the reproduced primary color image signals to be determined are expressed by the following equation:

$$\begin{bmatrix} R \\ G \\ B \end{bmatrix} = [IM - 1] \cdot \begin{bmatrix} Y \\ I - 8 \\ Q - 8 \end{bmatrix} \quad (20)$$

FIG. 12 shows one example of the images of the primary color signals $\overline{R}$, $\overline{G}$ and $\overline{B}$ obtained by that inverse conversion.

The individual picture element levels are not largely different, as is apparent from comparison between the reproduced primary color image of FIG. 12 and the original primary color image shown in FIG. 2.

In the embodiment thus far described, incidentally, the number of the white picture elements existing in each of the apertures A to D is counted when the value of the halftone images are inferred. Despite of this fact, however, the number of black picture elements may be counted.

On the other hand, the dither images are preferred as the binary images to the density pattern image. In case the dither image is to be used, it may resort not to the random or conditioned dither but preferably to the systematic dither method in which the threshold values are introduced one by one into the selected aperture D having the maximum area. In case the systematic dither method is used, the dispersion type dither image, in which the threshold values are uniformly introduced into the selected aperture A having the minimum area, is preferable, and the Bayer type dither image, in which the threshold values are completely dispersed, is especially preferable.

Of the several kinds of apertures, on the other hand, the size of the selected aperture D having the maximum area is preferably equal to that of the threshold matrix of the systematic dither image.

In the foregoing description, moreover, the four kinds are taken up as an example. However, the present invention should not be limited thereto but may use an arbitrary kind of scanning aperture.

The apertures need not have their sizes limited to those of the example but may have an arbitrary size.

Moreover, the television standard system for conversions into the luminance signal and the paired component color signals may be the PAL system or the SECAM system in place of the NTSC system. The paired chromaticity signals I and Q may be replaced by a pair of color difference signals R-Y and B-Y as the paired component color signals.

As has been described hereinbefore, according to the color data compressing method of the present invention, after the primary color signals of a digital color image have been converted into luminance signals and component color signals, these component color signals are compressed to generate compressed color signals, and the compressed color signals and the luminance signal are binarily processed, respectively, to form information-compressed binary images. As for the reproducing method, a proper scanning aperture is selected to form halftone images to be inferred. As a result, the present invention has at least the following features over the prior art:

(1) Since the color signals are compressed, the compressibility of the information to be transferred can be enhanced to remarkably improve the coding efficiency.

(2) Since the data compression considers the human visual characteristics, the original primary color images can be reproduced without having their qualities deteriorated.

(3) Since the data compressing and expanding processings are relatively simple, the data processing can be speeded up.

(4) Upon the data reproduction, conversion is made into the primary color image signals after the proper halftone images have been inferred. As a result, the reproduced primary color images are approximate to the original ones so that the quality of the reproduced image can be improved.

What is claimed is:

1. A method for converting halftone color image signals of a color image into binary image signals, and then generating restored color image signals from the binary image signals to reproduce said color image, comprising the steps of:
   (a) converting halftone primary color signals of picture elements in a digital color image into halftone luminance signals and halftone component color signals;
   (b) converting the halftone luminance signals and halftone component color signals, respectively, into binary luminance signals and binary component color signals;
   (c) transmitting the binary luminance signals and binary component color signals;
   (d) generating received binary luminance signals and received binary component color signals;
   (e) producing inferred halftone luminance signals from the received binary luminance signals and inferred halftone component color signals from the received binary component color signals by
      (i) designating a group of scanning apertures to be individually and selectively scanned over said picture elements,
      (iii) scanning said picture elements with each of the group of scanning apertures to obtain, for at least one picture element associated with application of a scanning aperture, scanning data for the received binary luminance signals and the received binary component color signals,
      (iii) selecting one of said group of scanning apertures as an identified aperture for said associated at least one picture element on the basis of a defined relationship established to identify the scanning aperture with the largest area of said group of scanning apertures which does not appreciably change levels of the received luminance signals and said received color component signals, and
      (iv) assigning an inferred halftone value to luminance signals and component color signals of said associated at least one picture element related to the scanning data obtained with the identified scanning aperture; and
   (f) converting the inferred halftone luminance signals and inferred halftone component color signals into restored primary color signals to reproduce said color image.

2. The method of claim 1 wherein the scanning data for a particular scanning aperture is determined from the number of white picture elements within the particular scanning aperture.

3. The method of claim 1 further comprising the step of compressing the binary component color signals.

4. The method of claim 3 further comprising the step of interpolating the received binary component color signals.

5. The method of claim 4 wherein the component color signals are chromaticity signals.

6. The method of claim 1 wherein the step of converting the luminance signals and component color signals into binary signals comprises applying a dither method.

7. The method of claim 6 wherein the dither method is an ordered dither method.

8. The method of claim 7 wherein the ordered dither method is a dot-dispersed type dither method.

9. The method of claim 8 wherein the dot-dispersed type dither method includes a Bayer-type dither pattern.

10. A color image data reproducing method for reproducing binary color images generated from both luminance signals and from compressed color signals generated from component color signals, comprising the steps of restoring binary images of said compressed color signals and said luminance signals into halftone images whereas the restored compressed color signals are reproduced into said component color signals; and converting said component color signals and said luminance signals of the restored halftone images into primary color signals composing a digital color image, said binary images being restored into halftone images by a scanning aperture being set in said binary images so that the halftone images may be restored on the basis of the number of white or black picture elements in said scanning aperture;

wherein a plurality of kinds of different scanning apertures are set as said scanning aperture; the number of said white or black picture elements in said scanning apertures being determined for each of the scanning apertures; a single aperture being selected for each picture element of the halftone image to be inferred by conducting a predetermined operation of the number of said determined white or black picture elements; and the halftone images being inferred on the basis of the number of said white or black picture elements in said selected scanning aperture.

* * * * *